(12) United States Patent
Okumichi et al.

(10) Patent No.: US 7,974,491 B2
(45) Date of Patent: Jul. 5, 2011

(54) BLOCK NOISE REMOVAL DEVICE

(75) Inventors: Kenji Okumichi, Tokyo (JP); Hirofumi Honda, Chuo (JP)

(73) Assignee: Pioneer Corporation, Tokyo (JP)

( * ) Notice: Subject to any disclaimer, the term of this patent is extended or adjusted under 35 U.S.C. 154(b) by 917 days.

(21) Appl. No.: 11/785,347

(22) Filed: Apr. 17, 2007

(65) Prior Publication Data
US 2008/0037893 A1 Feb. 14, 2008

(30) Foreign Application Priority Data

Apr. 18, 2006 (JP) .................................. 2006-114834

(51) Int. Cl.
*G06K 9/40* (2006.01)
(52) U.S. Cl. ..................... 382/268; 382/199; 382/232
(58) Field of Classification Search .................. 382/232, 382/268, 199
See application file for complete search history.

(56) References Cited

U.S. PATENT DOCUMENTS

| | | | | | |
|---|---|---|---|---|---|
| 5,229,864 | A | * | 7/1993 | Moronaga et al. | 382/261 |
| 5,748,788 | A | * | 5/1998 | Moro | 382/243 |
| 5,790,207 | A | * | 8/1998 | Jung | 348/699 |
| 5,796,875 | A | * | 8/1998 | Read | 382/261 |
| 5,828,467 | A | * | 10/1998 | Suzuki | 382/268 |
| 6,175,653 | B1 | * | 1/2001 | de Queiroz | 382/233 |
| 6,188,799 | B1 | | 2/2001 | Tan et al. | |
| 6,285,801 | B1 | * | 9/2001 | Mancuso et al. | 382/268 |
| 6,317,522 | B1 | * | 11/2001 | Rackett | 382/268 |
| 6,496,605 | B1 | * | 12/2002 | Osa | 382/268 |
| 7,003,174 | B2 | * | 2/2006 | Kryukov et al. | 382/266 |
| 2005/0244063 | A1 | * | 11/2005 | Kwon et al. | 382/233 |
| 2005/0276505 | A1 | * | 12/2005 | Raveendran | 382/268 |
| 2006/0018557 | A1 | * | 1/2006 | Kwon et al. | 382/232 |

FOREIGN PATENT DOCUMENTS

| | | |
|---|---|---|
| EP | 0998146 A1 | 5/2000 |
| EP | 1408697 A1 | 4/2004 |
| JP | 2000-50275 A | 2/2000 |
| JP | 2002-232889 A | 8/2002 |
| JP | 2003-023624 A | 1/2003 |
| JP | 2005-065098 A | 3/2005 |
| JP | 2005-072824 A | 3/2005 |

OTHER PUBLICATIONS

Japanese Office Action for Japanese Application No. 2007-106985 dated Apr. 19, 2011.

* cited by examiner

*Primary Examiner* — Samir A Ahmed
*Assistant Examiner* — Jayesh Patel
(74) *Attorney, Agent, or Firm* — Sughrue Mion, PLLC

(57) ABSTRACT

A block noise removal device calculates a block boundary correction value which indicates a correction amount for a pixel sample value immediately before a block boundary position and a correction amount for a pixel sample value immediately after the block boundary position for each block boundary position in a pixel sample value sequence. The block noise removal device obtains the block boundary correction value based on at least two consecutive pixel sample values immediately before the block boundary position and at least two consecutive pixel sample values immediately after the block boundary position. The block noise removal device generates a block noise correction signal representing a correction amount for the pixel sample values corresponding to respective pixels in the pixel block by performing interpolation computations based on the block boundary correction value found for each two adjacent block boundary positions.

5 Claims, 11 Drawing Sheets

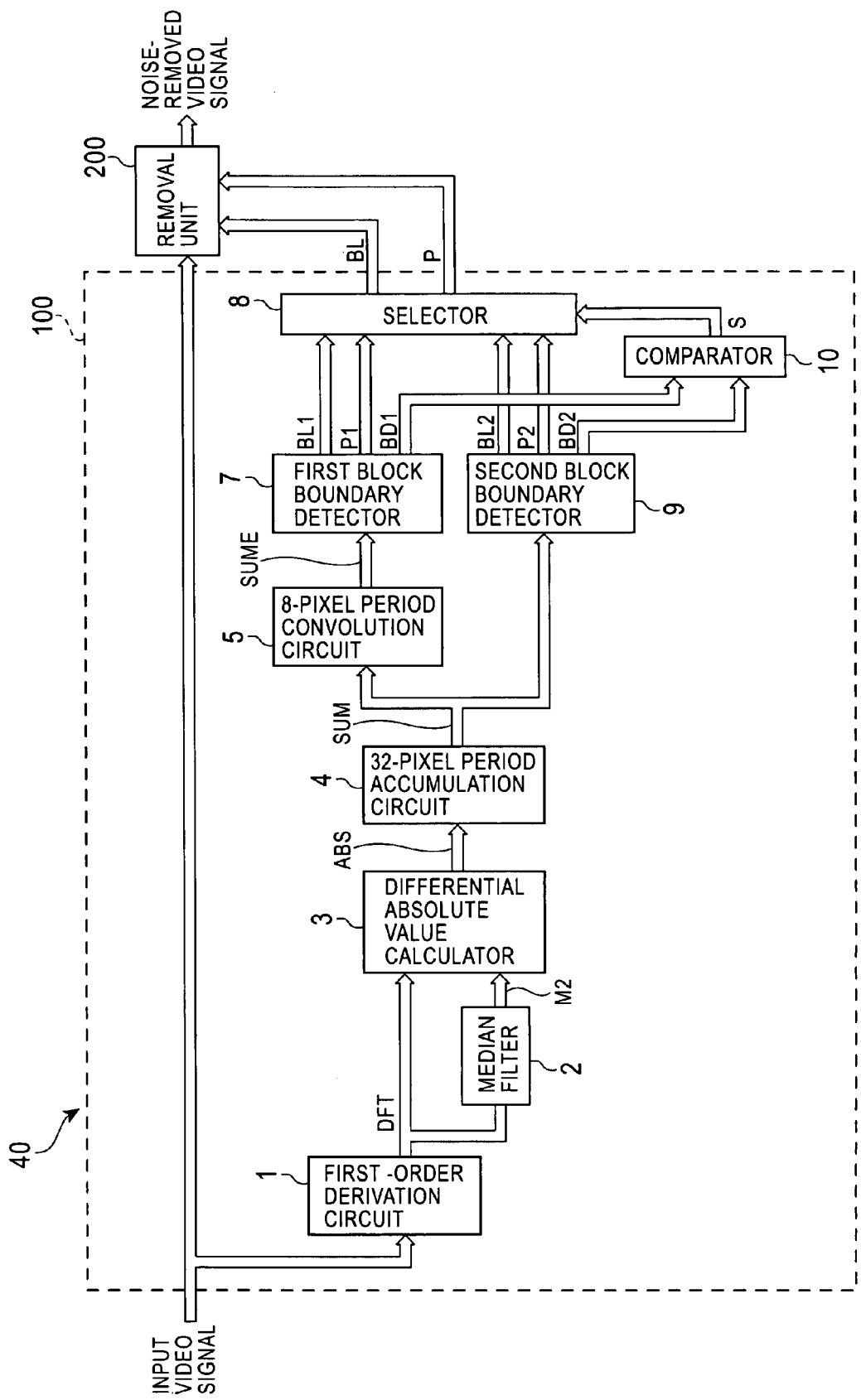

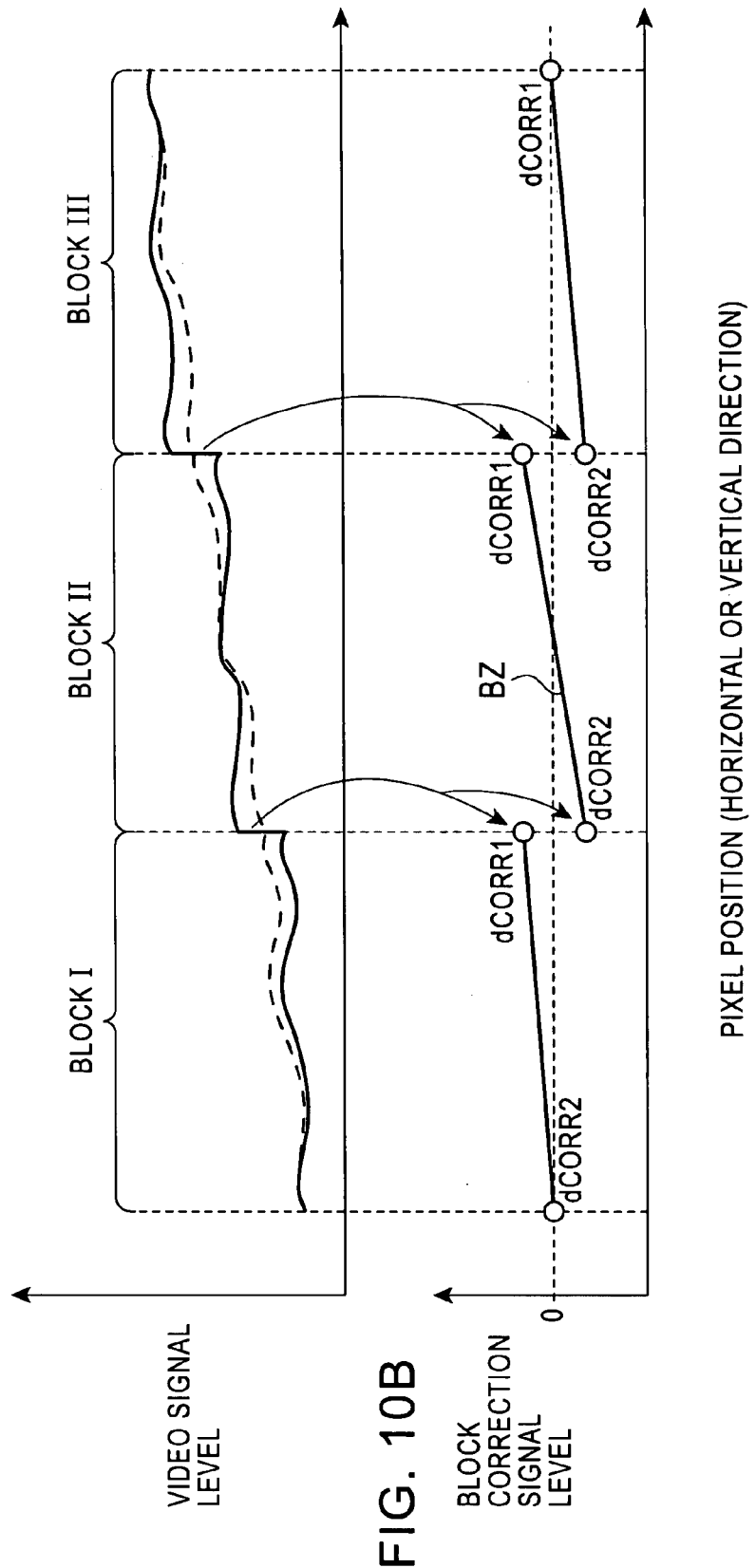

BLOCK NOISE REMOVAL DEVICE

BACKGROUND OF THE INVENTION

1. Field of the Invention

The present invention relates to a block noise removal device that removes block noise generated in decoding information data that are compression coded for each of blocks of the information data.

2. Description of the Related Art

Compression coding that employs a MPEG (Moving Picture Expert Group) method is often used for reducing the volume of information when video or audio signals are transmitted and/or recorded. With the MPEG coding processing, discrete cosine transformation (referred to hereinbelow as DCT) is implemented for each two-dimensional unit block with respect to a video signal, so as to obtain DCT coefficients of each frequency region, and then the volume of information is compressed by performing quantization processing. The larger is the quantization step used for the quantization processing, the higher is the compression ratio. However, because some values are omitted, the quantization noise is generated. Block noise is a typical example of such quantization noise. In the MPEG coding processing, because each of two-dimensional unit blocks is subjected to various processing, block boundaries appear when the blocks are decoded. Brightness signals and color difference signals are usually compressed when video signals are compressed. A variety of signal formats such as RGB signals can be considered as the video signal format.

Block noise removal devices that remove such block noise from MPEG-decoded video signals are known in the art. One example is disclosed in Japanese Patent Application Kokai (Laid-open) No. 2000-50275. This block noise removal device will be described with reference to FIG. 1 of the accompanying drawings. In this block noise removal device, the position of block boundary BB is detected from a video signal, and smoothing processing designed to correct the signal level is performed only to the pixels of the block boundary portion. As a result, the level transition in the block boundary portion is smoothed and the noise is removed.

However, such smoothing processing cannot achieve the effective noise removal when the difference in level between the adjacent blocks (BLOCK I and BLOCK II) is large.

SUMMARY OF THE INVENTION

It is one object of the present invention to provide a block noise removal device that can reliably remove block noise, without degrading the image quality, from video signals that are coded for each block and then decoded.

According to one aspect of the present invention, there is provided a block noise removal device for removing block noise from a decoded video signal. The decoded video signal is obtained by coding and decoding an input video signal for each pixel block composed of a plurality of pixels. The block noise removal device includes a boundary position detector for detecting a first block boundary position from the input video signal. The first block boundary position is a position of a boundary portion between a first pixel block and a next (or second) pixel block. The boundary position detector also obtains a second block boundary position. The second block boundary position is a position of a boundary portion between the second pixel block and a next (or third) pixel block. The block noise removal device also includes a first boundary correction amount calculator for calculating a first block boundary correction value. This calculation is performed based on at least two consecutive pixel sample values immediately before the first block boundary position and at least two consecutive pixel sample values immediately after the first block boundary position. The first block boundary correction value indicates (includes) a first correction amount and a second correction amount. The first correction amount is used for a pixel sample value immediately before the first block boundary position and the second correction amount is used for a pixel sample value immediately after the first block boundary position. Each pixel sample value represents a level of each pixel in the video signal (or in the block concerned), and continuous pixel sample values define a pixel sample value sequence. The block noise removal device also includes a second boundary correction amount calculator for calculating a second block boundary correction value. This calculation is performed based on at least two consecutive pixel sample values immediately before the second block boundary position and at least two consecutive pixel sample values immediately after the second block boundary position. The second block boundary correction value indicates (includes) a third correction amount for a pixel sample value immediately before the second block boundary position and a fourth correction amount for a pixel sample value immediately after the second block boundary position. The block noise removal device also includes a correction value interpolation unit for generating a block noise correction signal representing a correction amount for the pixel sample values of all pixels in the second pixel block. The block noise correction signal is obtained by interpolation computations based on the first block boundary correction value and the second block boundary correction value. The block noise removal device also includes a signal generator for adding the block noise correction signal to the video signal to generate a noise-removed video signal.

First, the first and second block boundary correction values are calculated. The block noise correction signal is then produced by the interpolation computations based on the first and second block boundary correction values. The block-noise-removed video signal is obtained by adding the block noise correction signal to the video signal.

With such block noise removal device, block noise can be reliably removed, without degrading the image quality, even if difference in level between adjacent blocks of the video signal is large.

These and other objects, aspects and advantages of the present invention will become apparent to those skilled in the art from the following detailed description and appended claims when read and understood in conjunction with the accompanying drawings.

BRIEF DESCRIPTION OF THE DRAWINGS

FIG. 2 illustrates a block diagram of a block noise removal device in accordance with one embodiment of the present invention;

FIG. 10A and FIG. 10B illustrate the operation of the interboundary correction value interpolation circuit shown in FIG. 8.

DETAILED DESCRIPTION OF THE INVENTION

Figure 1:
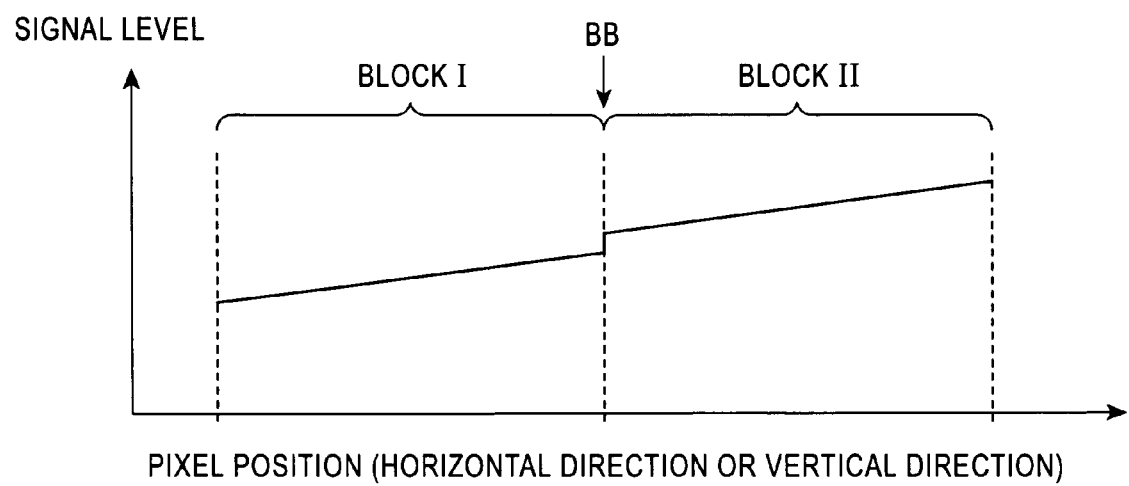
FIG. 1 illustrates an example of a video signal whose level increases gradually in the horizontal direction in each block.

An embodiment of the present invention will be described below with reference to the appended drawings.

Referring to FIG. 2, the configuration of a block noise removal device 40 according to one embodiment of the present invention will be described.

As shown in FIG. 2, the block noise removal device 40 includes a detection unit 100 and a removal unit 200. The detection unit 100 detects a block noise from (in) an input video signal. The removal unit 200 removes the block noise generated in the input video signal according to the block noise detection result.

The detection unit 100 has a first-order derivation circuit 1, a median filter 2, a differential absolute value computation circuit 3, a 32-pixel period accumulation circuit 4, an 8-pixel period convolution circuit 5, a first block boundary detection circuit 7, a selector 8, a second block boundary detection circuit 9, and a comparator 10.

The first-order derivation circuit 1 calculates a signal level difference between each two adjacent pixels as an interpixel differential value. The input video signal has signal levels to be given to the respective pixels. The first-order derivation circuit 1 supplies an interpixel differential value sequence DFT, that is composed of a plurality of interpixel differential values, to the median filter 2 and to the differential absolute value computation circuit 3.

The input video signal is a signal obtained by MPEG decoding a video signal that has been compression coded for each two-dimensional pixel block having 8 pixels (horizontal direction)×8 pixels (vertical direction) with a MPEG coder. A brightness signal is compression coded for each pixel block having 8 pixels (horizontal direction)×8 pixels (vertical direction) and decoded to a decoded signal of 8 pixels (horizontal direction)×8 pixels (vertical direction). However, because a color difference signal is handled with a signal value (volume) of ¼ that of the brightness signal, it is compression coded for each pixel block having 8 pixels (horizontal direction)×8 pixels (vertical direction) and decoded to a decoded signal of 16 pixels (horizontal direction)×16 pixels (vertical direction). The resolution of the input video signal can be [720×480 pixels], [1440×1080 pixels], and [1920×1080 pixels], but resolution conversion is sometimes performed to match the resolution of the display device at the tuner side after the MPEG decoding. This is called resizing. In the present specification, an example will be explained that deals with a video signal (input video signal) with a resolution of [1440×1080 pixels] after MPEG decoding or a resized video signal (input video signal) that has been resized to a resolution of [1920×1080 pixels]. The resizing is conducted in the horizontal direction after MPEG decoding. The resolution is increased by a factor of 1.33. 1440×1.33≈1920. The resolution of an actual input video signal can be of various types, as described above, and accordingly a variety of resizing can be considered in the future.

In the median filter 2, for every three consecutive interpixel differential values (or three alternate consecutive interpixel differential values) in the interpixel differential value sequence DFT, statistical processing is performed in order to obtain a central value M2 from among the three interpixel differential values. The median filter 2 sends the central value M2 to the differential absolute value computation circuit 3.

The differential absolute value computation circuit 3 calculates an absolute value of the difference between each interpixel differential value in the interpixel differential value sequence DFT and the central value M2 and takes the result as a unit block noise value ABS. The differential absolute value computation circuit 3 then sends the unit block noise value ABS to the 32-pixel period accumulation circuit 4.

The operation of the first-order derivation circuit 1, median filter 2, and differential absolute value computation circuit 3 will be described below with reference to FIGS. 3A to 3C.

Figure 3A:
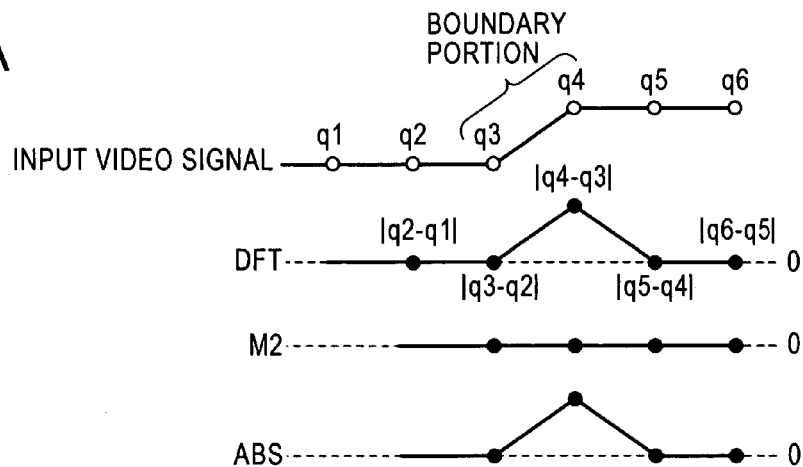
FIG. 3A to FIG. 3C illustrate the operation of a first-order derivation circuit, median filter, and differential absolute value computation circuit of the block noise removal device shown in FIG. 2.

FIG. 3A illustrates an example of an input video signal when the block boundary is present. FIG. 3A also shows the interpixel differential value sequence DFT, central value M2, and unit block noise value ABS of this input video signal.

With the input video signal shown in FIG. 3A, the interpixel differential value sequence DFT assumes a value other than zero only in one point (i.e., the block boundary section) and is zero in all other portions. Therefore, the central value M2 of the three consecutive interpixel differential values in the interpixel differential value sequence DFT is zero at all times. Consequently, the absolute value of the difference between the interpixel differential values in the interpixel differential value sequence DFT and the central value M2 (i.e., the unit block noise value ABS) has a value other than zero only in the block boundary section.

Figure 3B:
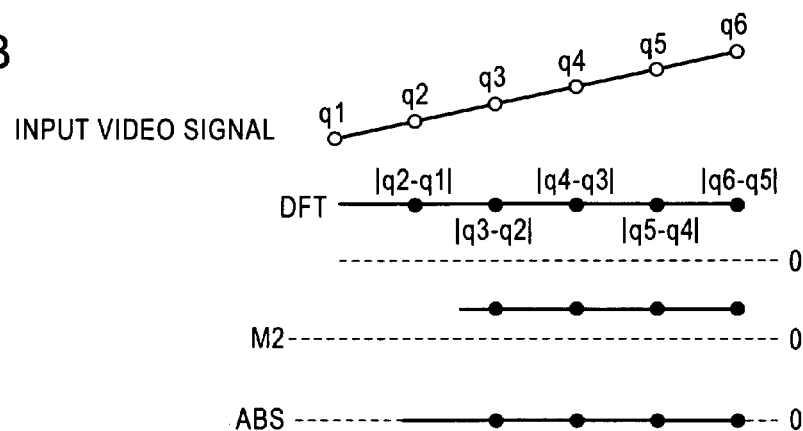

FIG. 3B shows an example of the input video signal when the block boundary is absent and the signal level of the input video signal increases gradually. This figure also shows the interpixel differential value sequence DFT, central value M2, and unit block noise value ABS obtained in this case.

As shown in FIG. 3B, with the input video signal that has a level changing in a slope-like fashion, the interpixel differential value sequence DFT assumes a value other than zero at all times, and the central value M2 of the three consecutive interpixel differential values in this interpixel differential value sequence DFT is equal to each interpixel differential value in the interpixel differential value sequence DFT. Therefore, the absolute value of the difference between the interpixel differential value sequence DFT and the central value $M2_n$, that is, the unit block noise value ABS, becomes zero. Consequently, even in the case where an input video signal is supplied that has a level changing in a slope-like fashion, the slope section cannot be erroneously determined as a block boundary section, and a unit block noise value ABS is obtained appropriately.

Figure 3C:
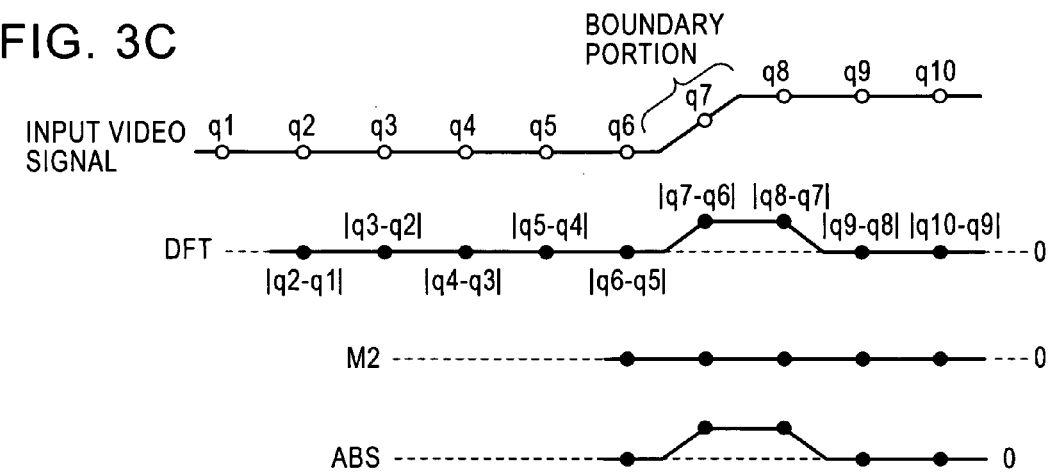

FIG. 3C shows another example when the block boundary exists. The input video signal is subjected to analog conversion or resizing before and after the block boundary. FIG. 3C also shows the interpixel differential value sequence DFT, central value M2, and unit block noise value ABS obtained in this case.

As shown in FIG. 3C, the input video signal that is subjected to analog conversion or resizing has a somewhat smoothed block boundary, that is, a blurred state is assumed. With respect to such an input video signal, the median filter 2 extracts three consecutive alternate interpixel differential values from the interpixel differential value sequence DFT, performs a statistical processing designed to find a central value M2 therefrom, and supplies the central value M2 to the differential absolute value computation circuit 3. As a result, the unit block noise value ABS that assumes a value other than zero only in the block boundary section can be generated as shown in FIG. 3C even if the input video signal has the block boundary which assumes a blurred state due to analog conversion or resizing.

The 32-pixel period accumulation circuit 4 performs the below-described accumulation addition based on such unit block noise value ABS.

Figure 4:
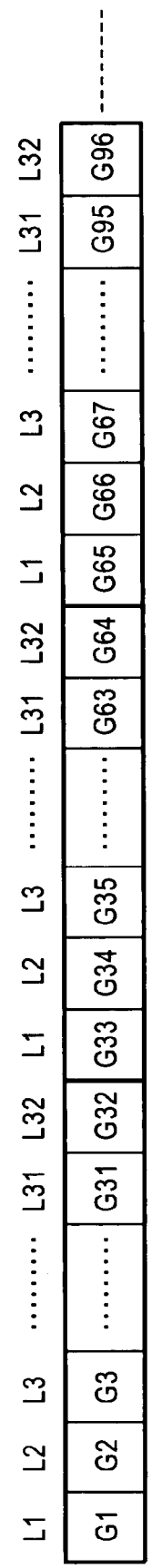
FIG. 4 illustrates 32 pixel position labels allocated correspondingly to pixel positions of every 32 consecutive pixels.

The 32-pixel period accumulation circuit 4, first, divides pixels G of one frame in a display device (not shown in the figure) into a plurality of pixel groups as shown in FIG. 4. Each pixel group is surrounded by the bold solid line, and is composed of 32 pixels adjacent (continuous) in the horizontal direction (or the vertical direction). The 32-pixel period accumulation circuit 4 allocates pixel position labels L1 to L32 to the pixel positions in each pixel group. Then, the 32-pixel period accumulation circuit 4 accumulates over one screen the unit block noise values ABS that correspond to the pixels arranged in the pixel positions within the pixel group indicated by a pixel position label L concerned. This accumulation is performed for each of the pixel position labels L1 to L32. The 32 accumulation results for the 32 pixel position labels L1 to L32 are taken as block noise values SUM1 to SUM32.

Thus, in the input video signals obtained by compression coding and decoding for each block composed of 8 pixels (horizontal direction)×8 pixels (vertical direction), the block noise arises for each 8-pixel period. On the other hand, in the input video signal that is resized to a resolution [1920 pixels] that is by a factor 1.33 higher than the resolution in the horizontal direction of the video signal having a resolution of [1440×1080 pixels] obtained by compression coding and decoding for each such block, the block noise arises for each (8×1.33)-pixel period, that is, for each about 10.67-pixel period.

Accordingly, in order to detect the block boundary position causing the block noise for both the video signal that is not resized and for the video signal that is resized to a resolution increased by a factor of 1.33, the 32-pixel period accumulation circuit 4 is configured to obtain the block noise values SUM1 to SUM32 by performing the accumulation of unit block noise values ABS for each 32-pixel period that is the least common multiple of 8 pixels and (8×1.33) pixels. Thus, the 32-pixel period accumulation circuit 4 performs the accumulation of unit block noise values for each M-pixel period that is the least common multiple of N and N·Q with respect to both the video signal that is obtained by coding and decoding for each two-dimensional pixel block composed of N×N pixels and the resized video signal that is obtained by resizing the resolution of the video signal by a factor of Q, thereby obtaining the first to M-th block noise values (SUM1 to SUM32).

Figure 5:
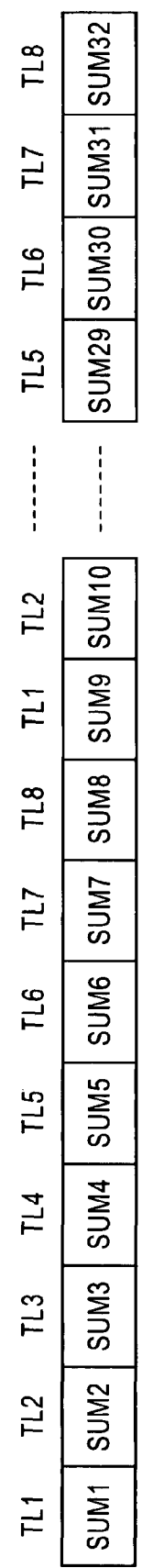
FIG. 5 illustrates 8 pixel position labels that are allocated anew to 32 block noise values.

The 8-pixel period convolution circuit 5 periodically allocates pixel position labels TL1 to TL8 to the block noise values SUM1 to SUM32, as shown in FIG. 5. One label TL is attached to one block noise value SUM. The pixel position labels TL1 to TL8 are allocated in this order. Then, the 8-pixel period convolution circuit 5 accumulates block noise values SUM to which the pixel position label TL concerned has been allocated. This accumulation is performed for each pixel position label TL. The 8 accumulation results for the pixel position labels TL1 to TL8 are taken as new block noise values SUME1 to SUME8. The 8-pixel period convolution circuit 5 supplies the new block noise values SUME1 to SUME8 to the first block boundary detection circuit 7.

The first block boundary detection circuit 7, first, determines the maximum block noise value among the block noise values SUME1 to SUME8 and takes it as a maximum block noise value $SUME_{MAX}$. Then, the first block boundary detection circuit 7 takes the larger of the block noise values SUME of the pixel position labels TL adjacent on both sides to the pixel position label TL that has been allocated to this maximum block noise value $SUME_{MAX}$ as a phase error block noise value $SUME_{FE}$. Then, the first block boundary detection circuit 7 calculates the difference between the maximum block noise value $SUME_{MAX}$ and the maximum of the block noise values SUME1 to SUME8 from which the maximum block noise value $SUME_{MAX}$ and the phase error block noise value $SUME_{FE}$ have been excluded. The first block boundary detection circuit 7 supplies this difference as a non-resized boundary determination value BD1 to the comparator 10. The first block boundary detection circuit 7 then determines whether the non-resized boundary determination value BD1 is larger than a predetermined threshold S1. When the non-resized boundary determination value BD1 is determined to be larger than the predetermined threshold S1, the first block boundary detection circuit 7 determines that each pixel position of each 8-pixel period indicated by the pixel position label TL having the maximum block noise value $SUME_{MAX}$ is a block boundary position. The first block boundary detection circuit 7 supplies a block boundary position signal BL1 indicating the block boundary positions to the selector 8. The first block boundary detection circuit 7 then generates a phase error signal P1 that has a polarity decided by the direction of the pixel position label TL having the phase error block noise value $SUME_{FE}$ with respect to the pixel position label TL having the maximum block noise value $SUME_{MAX}$. The phase error signal P1 has a value decided by the ratio of the phase error block noise value $SUME_{FE}$ to the maximum block noise value $SUME_{MAX}$. The first block boundary detection circuit 7 supplies this phase error signal P1 to the selector 8.

The pixel position having the maximum block noise value $SUME_{MAX}$ is taken as $TL_{MAX}$ and the pixel position having the phase error block noise value $SUME_{FE}$ is taken as $TL_{FE}$. The adjacent pixel positions change by one unit. The operations when the pixel position $TL_{MAX}$ is positioned to the left of the pixel position $TL_{FE}$ and when the pixel position $TL_{MAX}$ is positioned to the right of the pixel position $TL_{FE}$ will be explained with reference to FIG. 6A and FIG. 6B, respectively.

Figure 6A:
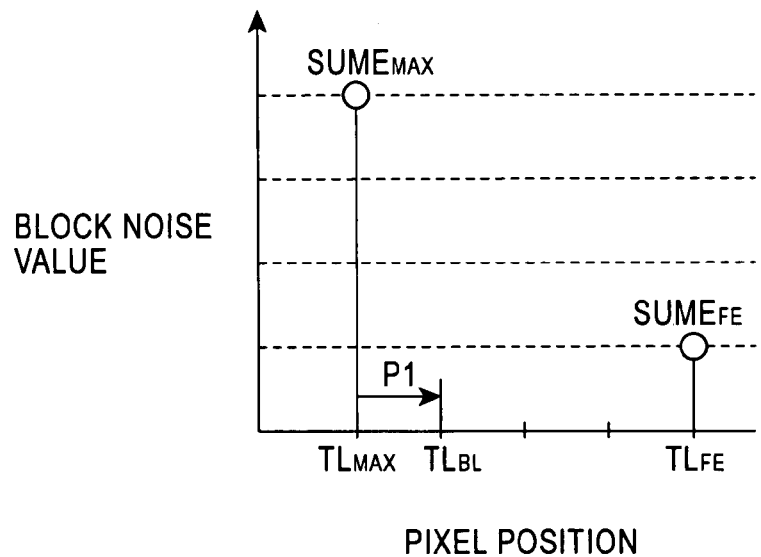
FIG. 6A illustrates the operation to find a phase error signal.

(A) When the Pixel Position $TL_{MAX}$ is Positioned to the Left of the Pixel Position $TL_{FE}$ As shown in FIG. 6A, when the pixel position $TL_{MAX}$ is positioned on the "−" side of the pixel position $TL_{FE}$, that is, to the left of the pixel position $TL_{FE}$, the block boundary position BL1 is taken as the pixel position $TL_{MAX}$. A block noise position $TL_{BL}$ becomes a position between the pixel positions $TL_{MAX}$ and $TL_{FE}$. This position is decided by the ratio between the maximum block noise value $SUME_{MAX}$ and the phase error block noise value $SUME_{FE}$. Therefore, the amount (distance) of displacement to the "+" side, that is, to the right, as shown in FIG. 6A, from the block boundary position BL1 becomes a phase difference error signal P1 representing the phase error. Thus, the phase difference error signal P1 is given by the following formula (1):

$$P1 = SUME_{FE}/(SUME_{MAX} + SUME_{FE}) \qquad (1)$$

At this time, $0 \leq P1 < 0.5$.

This is because when P1 is equal to or more than 0.5, it follows from Formula (1) that $SUME_{MAX} < SUME_{FE}$, which contradicts the definition.

Figure 6B:
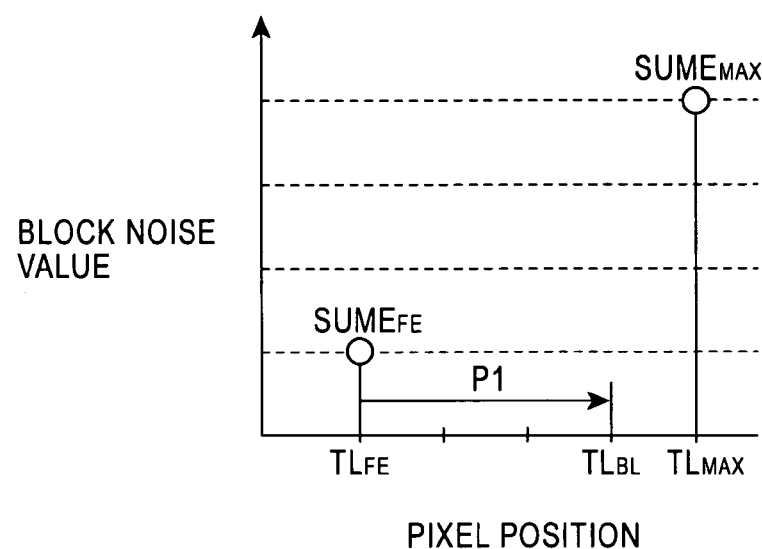
FIG. 6B illustrates another operation to find a phase error signal.

(B) When the Pixel Position $TL_{MAX}$ is Positioned to the Right of the Pixel Position $TL_{FE}$ As shown in FIG. 6B, when the pixel position $TL_{MAX}$ is positioned on the "+" side of the pixel position $TL_{FE}$, that is, to the right thereof, the block boundary position BL1 is taken as the pixel position $TL_{FE}$. The block noise position $TL_{BL}$ becomes a position between the pixel positions $TL_{MAX}$ and $TL_{FE}$ which is decided by the ratio between the maximum block noise value $SUME_{MAX}$ and the phase error block noise value $SUME_{FE}$. Therefore, the amount of displacement to the "+" side, that is, to the right, as shown in FIG. 6B, from the block boundary position BL1 becomes a phase difference error signal P1 representing the phase error. Thus, the phase difference error signal P1 is given by the formula (2):

$$P1 = SUME_{MAX}/(SUME_{MAX} + SUME_{FE}) \qquad (2)$$

At this time, 0.5<P1<1.

This is because when P1 is equal to or less than 0.5, it follows from Formula (2) that $SUME_{MAX} < SUME_{FE}$, which contradicts the definition.

The block boundary position BL1 serving as a reference for the phase error signal P1 is a position on the "−" side, that is, on the left side, from amongst the pixel position $TL_{MAX}$ and pixel position $TL_{FE}$ in this embodiment, but this is only for the convenience of computation. The block noise position $TL_{BL}$ that takes the phase error signal P1 into account is given by the following computation (Formula (3)).

$$TL_{BL} = (TL_{MAX} \cdot SUME_{MAX} + TL_{FE} \cdot SUME_{FE})/(SUME_{MAX} + SUME_{FE}) \qquad (3)$$

If the non-resized boundary determination value BD1 is determined to be less than the predetermined threshold S1 the first block boundary detection circuit 7 determines that the block boundary is not present and the BD1 is "0." The first block boundary detection circuit 7 sends the BD1 to the comparator 10.

The second block boundary detection circuit 9, first, determines the maximum block noise value SUM from amongst the block noise values SUM1 to SUM32 and takes the determined value as the maximum block noise value $SUM_{MAX}$. Then, the second block boundary detection circuit 9 takes the larger of the block noise values SUM that correspond to the pixel position labels L adjacent on both sides of the pixel position label L that has been allocated to the maximum block noise value $SUM_{MAX}$ as a phase error block noise value $SUM_{FE}$. The second block boundary detection circuit 9 finds the second largest block noise value in a position at a distance of one resized block size, that is, 10 pixels or 11 pixels, from the position of the maximum block noise value $SUM_{MAX}$, and takes this noise value as a second maximum block noise value $SUM_{MAX2}$. The larger of the block noise values SUM corresponding to the pixel position labels L adjacent on both sides of the pixel position label L that has been allocated to the second maximum block noise value is taken as the second phase error block noise value $SUM_{FE2}$. Also, the second block boundary detection circuit 9 finds the third largest block noise value in a position at a distance of two block sizes, that is, 21 pixel or 22 pixels, from the position of the maximum block noise value $SUM_{MAX}$, and takes this noise value as a third block noise value $SUM_{MAX3}$. The larger of the block noise values SUM corresponding to the pixel position labels L adjacent on both sides of the pixel position label L that has been allocated to the third maximum block noise value is taken as the third phase error block noise value $SUM_{FE3}$. The second block boundary detection circuit 9 calculates the difference between the maximum block noise value $SUM_{MAX}$ and the maximum of the block noise values SUM1 to 32 from which the maximum block noise value $SUM_{MAX}$, second maximum block noise value $SUM_{MAX2}$, third maximum block noise value $SUM_{MAX3}$, phase error block noise value $SUM_{FE}$, second phase error block noise value $SUM_{FE2}$, and third phase error block noise value $SUM_{FE3}$ have been excluded, and takes this difference as a resized boundary determination value BD2. The second block boundary detection circuit 9 supplies the value BD2 to the comparator 10. The second block boundary detection circuit 9 then determines whether the resized boundary determination value BD2 is larger than a predetermined threshold S2. When the resized boundary determination value BD2 is determined to be larger than the predetermined threshold S2, the second block boundary detection circuit 9 determines that each pixel position of each 10.67-pixel period taking as a reference a pixel position indicated by the pixel position label L having the maximum block noise value $SUM_{MAX}$ is a block boundary position, and supplies a block boundary position signal BL2 indicating the block boundary positions to the selector 8. The second block boundary detection circuit 9 then generates a phase difference error signal P2 that has a polarity decided by the direction of the pixel position label L having the phase error block noise value $SUM_{FE}$ with respect to the pixel position label L having the maximum block noise value $SUM_{MAX}$. The phase difference error signal P2 has a value decided by the ratio of the phase error block noise value $SUM_{FE}$ to the maximum block noise value $SUM_{MAX}$. The second block boundary detection circuit supplies this phase difference error signal P2 to the selector 8. The block boundary position signal BL2 is computed in the below described manner which is similar to the manner of computing the block boundary position signal BL1.

The pixel position having the maximum block noise value $SUM_{MAX}$ is taken as $T_{MAX}$ and the pixel position having the phase error block noise value $SUM_{FE}$ is taken as $T_{FE}$. When the pixel position $T_{MAX}$ is positioned on the "−" side of the pixel position $T_{FE}$, that is, to the left thereof, the block boundary position BL2 is taken as the pixel position $T_{MAX}$. A block noise position $T_{BL}$ becomes a position between the pixel position $T_{MAX}$ and the pixel position $TL_{FE}$ decided by the ratio between the maximum block noise value $SUM_{MAX}$ and phase error block noise value $SUM_{FE}$. Therefore, the distance to the "+" side, that is, to the right, from the block boundary position BL2 is given by the formula (4), and taken as a phase difference error signal P2.

$$P2 = SUM_{FE}/(SUM_{MAX} + SUM_{FE}) \qquad (4)$$

When the pixel position $T_{MAX}$ is positioned on the "+" side of the pixel position $T_{FE}$, that is, to the right thereof, the block boundary position BL2 is taken as the pixel position $T_{FE}$. A block noise position $T_{BL}$ becomes a position between the pixel positions $T_{MAX}$ and $T_{FE}$ and is decided by the ratio of the maximum block noise value $SUM_{MAX}$ and phase error block noise value $SUM_{FE}$. Therefore, the distance to the "+" side, that is, to the right, from the block boundary position BL2 is given by the formula (5) and taken as a phase difference error signal P2.

$$P2 = SUM_{MAX}/(SUM_{MAX} + SUM_{FE}) \qquad (5)$$

The block noise position $T_{BL}$ that takes the phase difference error signal P2 into account is given by the following computation (formula (6)).

$$T_{BL} = (T_{MAX} \cdot SUM_{MAX} + T_{FE} \cdot SUM_{FE})/(SUM_{MAX} + SUM_{FE}) \qquad (6)$$

The block boundary position BL2 and phase difference error signal P2 are calculated in a similar manner from the second maximum block noise value $SUM_{MAX2}$, second phase error block noise value $SUM_{FE2}$, third maximum block noise value $SUM_{MAX3}$, and third phase error block noise value $SUM_{FE3}$. Thus, the second block boundary detection circuit 9 detects three block boundaries that are arranged with a 10.67-pixel period from amongst the block noise values SUM1 to SUM32, and calculates three respective block boundary positions BL2 and three phase difference error signals P2 from the three block boundaries, respectively. One resized boundary determination value BD2 is also calculated. When the value BD2 is less than the threshold value S2, the value BD2 is taken as zero (BD2=0) and supplied to the comparator 10.

The comparator 10 performs value comparison of the non-resized boundary determination value BD1 and resized boundary determination value BD2. When the comparison result shows that the value BD1 is larger than the value BD2, the comparator 10 supplies to the selector 8 a selection signal S to select the block boundary position signal BL1 and phase error signal P1 that are supplied from the first block boundary detection circuit 7. On the other hand, when the comparator 10 determines that the value BD2 is larger than the value BD1, the comparator supplies to the selector 8 a selection signal S that has to select the block boundary position signal BL2 and phase error signal P2 that are supplied from the second block boundary detection circuit 9. When both the values BD1 and BD2 are "0", it is determined that block noise is absent, and the removal unit 200 generates the noise-deleted video signal, without deleting the block noise.

From amongst the block boundary position signals BL1 and BL2, the selector 8 selects a signal that is designated by the selection signal S, and supplies the selected signal as a block boundary position signal BL that represents the final block boundary position to the removal unit 200. From amongst the phase error signals P1 and P2, the selector 8 selects a signal that is designated by the selection signal S, and supplies the selected signal as a phase error signal P that represents the final phase error to the removal unit 200. However, if both the first block boundary detection circuit 7 and the second block boundary detection circuit 9 determine that block boundary is not present (that is, when the boundary detection value BD1 is less than the first threshold S1, and the boundary determination value BD2 is less than the second threshold S2), the removal unit 200 issues the input video signal as a noise-removed video signal, without performing the block noise removal operation.

The operation of the detection unit 100 having the above-described configuration will be explained below with reference to the case where the input video signal is not a resized signal (digital or analog) and the case where it is a resized signal (digital or analog).

(1) The Case where the Input Video Signal is not Subjected to Resizing

Figure 7A:
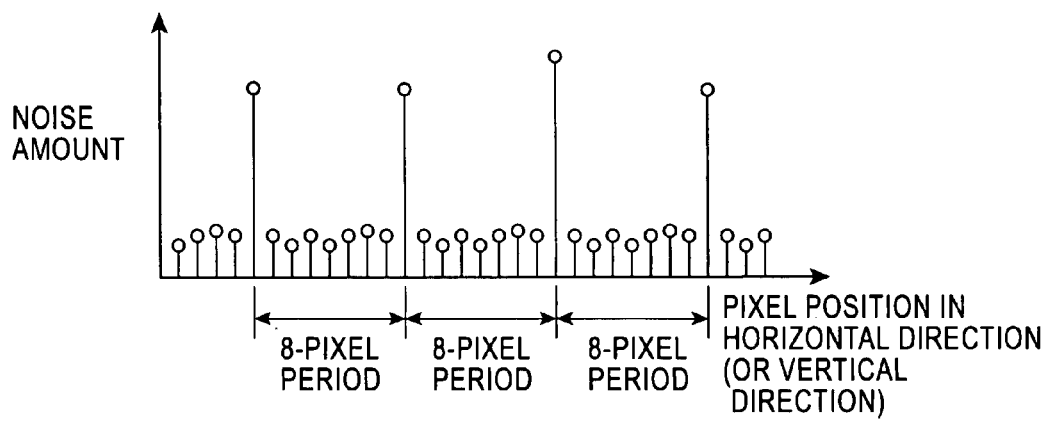
FIG. 7A to FIG. 7C illustrate the operation of a detection unit of the block noise removal device shown in FIG. 2.
Figure 7B:
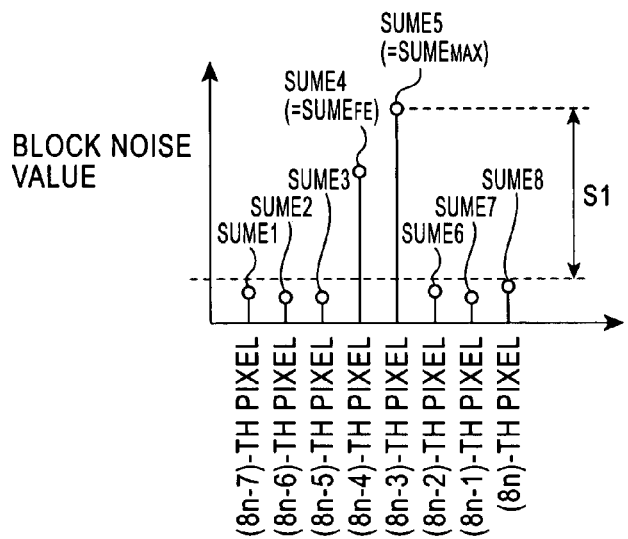

If a block noise is present in the input video signal that is obtained by decoding a video signal that has been compression coded for each 8×8 pixel block, the noise peak appears for each 8-pixel period, as shown in FIG. 7A. First, the interpixel differential values (ABS) for the respective pixels are calculated by the first-order derivation circuit 1, median filter 2, and differential absolute value computation circuit 3. Then, for each pixel of a pixel disposed in the (8n−7)-th position,
a pixel disposed in the (8n−6)-th position,
a pixel disposed in the (8n−5)-th position,
a pixel disposed in the (8n−4)-th position,
a pixel disposed in the (8n−3)-th position,
a pixel disposed in the (8n−2)-th position,
a pixel disposed in the (8n−1)-th position,
a pixel disposed in the (8n)-th position,
(where n is a natural number)

in the horizontal direction (or vertical direction), the 32-pixel period accumulation circuit 4 and 8-pixel period convolution circuit 5 accumulate the interpixel differential values corresponding to these pixels over one screen and generate block noise values SUME1 to SUME8. The first block boundary detection circuit 7 determines a maximum value ($SUME_{MAX}$) from amongst the block noise values SUME1 to SUME8 and takes a larger from among the block noise values SUME corresponding to adjacent pixels on both sides of the pixel having the $SUME_{MAX}$ as a value ($SUME_{FE}$) affected by the phase error. For example, when the block noise values SUME1 to SUME8 of the pixels disposed in the (8n−7)-th to (8n)-th positions are in the state shown in FIG. 7B, the block noise value SUME5 becomes the $SUME_{MAX}$, and the block noise value SUME4 becomes the $SUME_{FE}$. If block noise is present, as shown in FIG. 7B, the SUME5 serving as $SUME_{MAX}$ is larger, by the amount greater than the threshold value S1 or more, than any of the block noise values SUME except the SUME4 serving as the $SUME_{FE}$. Accordingly, the first block boundary detection circuit 7 calculates the difference between the $SUME_{MAX}$ and the SUME that is the largest from amongst the block noise value SUME1 to SUME8 from which the values $SUME_{MAX}$ and $SUME_{FE}$ have been excluded and takes this difference as the non-resized boundary determination value BD1. When this non-resized boundary determination value BD1 is larger than the predetermined threshold S1, the first block boundary detection circuit 7 determines that the block boundary is present. The first block boundary detection circuit 7 generates a block boundary position signal BL1 that indicates the pixel position of each 8-pixel period for which the pixel position having the $SUME_{MAX}$ is taken as a reference. The block boundary position signal BL1 indicates the block boundary position. For example, in the case shown in FIG. 7B, the first block boundary detection circuit 7 generates a block boundary position signal BL1 that indicates that the pixel position corresponding to the block noise value SUME5, i.e., the (8n−3)-th pixel position is the block boundary position.

If the input video signal is an analog signal, the transition of the signal level at the block boundary is smooth and the block boundary positions is blurred. As a result, the detection of block boundary position is sometimes accompanied by a phase error. For example, as shown in FIG. 7B, the pixels adjacent to the pixel having the $SUME_{MAX}$ are affected by this phase error. Consequently, the block noise values SUME corresponding to the pixels adjacent on both sides to the pixel having the $SUME_{MAX}$ assume maximum values.

As already described above, the first block boundary detection circuit 7 takes as a phase error block noise value ($SUME_{FE}$) the larger from amongst the block noise values SUME of the pixels adjacent on both sides to the pixel having the maximum block noise value $SUME_{MAX}$. The pixel position having the maximum block noise value $SUME_{MAX}$ is taken as $TL_{MAX}$, the pixel position having the phase error block noise value $SUME_{FE}$ is taken as $TL_{FE}$, and the block noise position $TL_{BL}$ is represented by Formula (3) based on the ratio of $SUME_{MAX}$ to $SUME_{FE}$.

$$TL_{BL}=(TL_{MAX} \cdot SUME_{MAX}+TL_{FE} \cdot SUME_{FE})/(SUME_{MAX}+SUME_{FE})$$

When the phase error is absent, the pixel position $TL_{MAX}$ corresponding to the $SUME_{MAX}$ becomes the block boundary position signal BL1, as described above. However, when the phase error is present, a block boundary position signal BL1 is generated that indicates the pixel position on the left side from amongst the pixel position $TL_{MAX}$ and pixel position $TL_{FE}$ as the block boundary position. For example, in the case shown in FIG. 7B, the first block boundary detection circuit 7 generates a block boundary position signal BL1 that indicates that the pixel corresponding to the block noise value SUME4, that is, the (8n−4)-th pixel position is the block boundary position. The block noise position $TL_{BL}$ assumes a position shifted by the phase error signal P1 to the "+" side, that is, to the right, with respect to boundary position signal BL1. The phase error signal P1 is represented by the distance obtained when the shift of one pixel is taken as "1". The phase error signal P1 is given by formula (1) or (2) as shown in FIG. 6A or 6B.

(2) The Case where the Input Video Signal is Subjected to Resizing

Figure 7C:
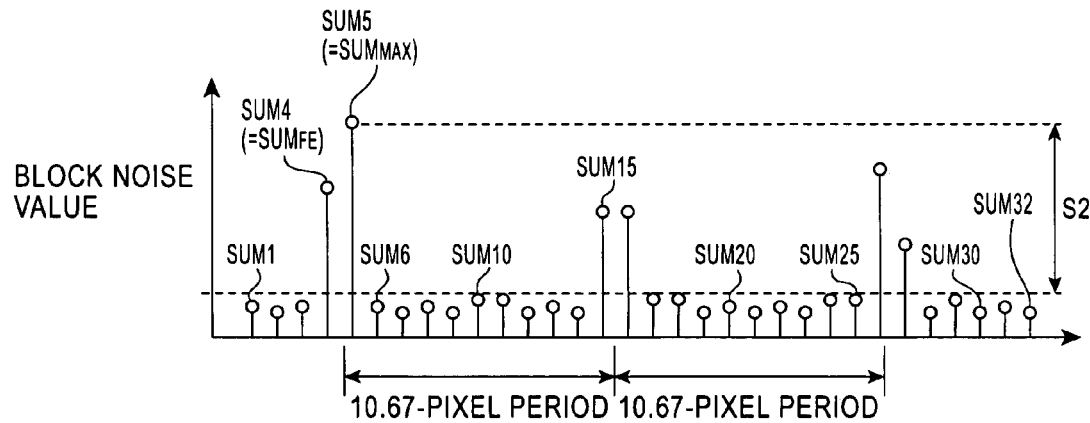

If block noise is present in the input video signal obtained by resizing the resolution of the video signal that is compression coded and decoded for each block (8×8 pixels) from [1440×1080 pixels] to [1920×1080 pixels], as shown in FIG. 7C, the noise peak thereof is represented for each [(8×1920)/1440 pixel] period, that is, 10.67 pixel period. Accordingly, for each pixel of a pixel disposed in the (32n−31)-th position, a pixel disposed in the (32n−30)-th position,
a pixel disposed in the (32n−29)-th position,
. . .
a pixel disposed in the (32n−1)-th position,
a pixel disposed in the (32n)-th position,
(where n is a natural number)

in the horizontal direction (or vertical direction), the second block boundary detection circuit 9 executes the following processing based on the block noise value SUM1 to SUM32 obtained by accumulating the unit block noise values ABS over one screen. First, the second block boundary detection circuit 9 determines a maximum value ($SUM_{MAX}$) from amongst the block noise values SUM1 to SUM32 and takes the larger from amongst the block noise values SUM of the pixels adjacent on both sides to the pixel having the $SUM_{MAX}$ as a phase error block noise value ($SUM_{FE}$). The second largest block noise value SUM and the third largest block noise value SUM are determined from amongst the block noise values SUM1 to SUM32 and they are taken as the second maximum block noise value $SUM_{MAX2}$ and the third maximum block noise value $SUM_{MAX3}$. The larger from amongst the block noise values SUM of the pixel position labels L adjacent on both sides to the pixel position label L allocated to the second maximum block noise value is taken as the second phase error block noise value $SUM_{FE2}$, and the larger from amongst the block noise values SUM of the pixel position labels L adjacent on both sides to the pixel position label L allocated to the third maximum block noise value is taken as third phase error block noise value $SUM_{FE3}$. For example, in the case shown in FIG. 7C, the block noise value SUM5 is the $SUM_{MAX}$, and the block noise value SUM4 is the $SUM_{FE}$. Likewise, the block noise value SUM26 becomes the $SUM_{MAX2}$, the block noise value SUM27 becomes $SUME_{FE2}$, the block noise value SUM15 becomes the $SUM_{MAX3}$, and the block noise value SUM16 becomes the $SUME_{FE3}$. If block noise is present, a difference is found between the maximum block noise value $SUM_{MAX}$ and the maximum of the block noise values SUM1 to SUM32 from which the maximum block noise value $SUM_{MAX}$, second maximum block noise value $SUM_{MAX2}$, third maximum block noise value $SUM_{MAX3}$, phase error block noise value $SUM_{FE}$, second phase error block noise value $SUM_{FE2}$, and third phase error block noise value $SUM_{FE3}$ have been excluded, and this difference is supplied as a resized boundary determination value BD2 to the comparator 10. As shown in FIG. 7C, the block noise value SUM5 (i.e., $SUM_{MAX}$) is greater than all the block noise values SUM except the block noise values SUM26 (i.e., $SUM_{MAX2}$), SUM15 (i.e., $SUM_{MAX3}$), SUM4 (i.e., $SUM_{FE}$), SUM27 (i.e., SUM, SUM16 (i.e., $SUM_{FE3}$) by the amount of the predetermined threshold S2 or more. Accordingly, the second block boundary detection circuit 9 determines whether the resized boundary determination value BD2 is larger than the predetermined threshold S2. When the resized boundary determination value BD2 is determined to be larger than the predetermined threshold S2, the second block boundary detection circuit 9 determines that the block boundary is present. The second block boundary detection circuit 9 then generates a block boundary position signal BL2 that indicates as a block boundary position the pixel position of each 10.67 pixel period taking as a reference a pixel position having the $SUM_{MAX}$. In other words, even if a video signal is compression coded and decoded for each 8×8 pixels, when resizing is performed from the resolution of [1440×1080 pixels] to [1920×1080 pixels], the following formula $$10.67 \approx (8 \times 1920)/1440$$

makes it possible to assume that the block boundary is appears for each 10.67-pixel period. Accordingly, each pixel position of each 10.67-pixel period taking as a reference the pixel position having the maximum value ($SUM_{MAXM}$) is determined as the block boundary position.

In the case shown in FIG. 7C, the second block boundary detection circuit 9 generates a block boundary position signal BL2 that indicates as a block boundary position each pixel position of each 10.67-pixel period taking as a reference the pixel having the block noise value SUM5, that is, the (32n−27)-th pixel position.

However, if the block period does not become an integer due to resizing, regardless of whether the input video signal is an analog signal or a digital signal, the block boundary position is blurred. As a result, the detection of block boundary position is sometimes accompanied by a phase error. At this time, for example, as shown in FIG. 7C, the pixels adjacent to the pixel having the $SUM_{MAX}$ are affected by this phase error. Consequently, the block noise values SUM of the pixels adjacent on both sides to the pixel having the $SUM_{MAX}$ assume large values. Accordingly, the second block boundary detection circuit 9, as described above, takes the larger value from amongst the block noise values SUM of the pixels adjacent on both sides to the pixel having the block noise value $SUM_{MAX}$ as a value ($SUM_{FE}$) affected by the phase error, and finds the phase error (P2) based on the ratio of this $SUM_{FE}$ to $SUM_{MAX}$. If a phase error is present, the left pixel position from amongst the pixel position $TL_{MAX}$ and pixel position $TL_{FE}$ is taken as the block boundary position signal BL1. This is similar to the case in which the input video signal is an analog signal that has not be subjected to resizing. When the phase error is present, the block noise position $TL_{BL}$ is given by Formula (3). The phase error signal P2 is given by formula (4) or (5).

As described above, the detection unit 100 includes the first block boundary detection circuit 7 that finds a block boundary position (BL1) and a phase error value (P1) with respect to an input video signal that has not been subjected to resolution resizing. The detection unit 100 also includes the second block boundary detection circuit 9 that finds a block boundary position (BL2) and a phase error value (P2) with respect to an input video signal that has been subjected to resizing. The first block boundary detection circuit 7 is separate from the second block boundary detection circuit 9. The non-resized boundary determination value (BD1) calculated by the first block boundary detection circuit 7 is compared with the resized boundary determination value (BD2) calculated by the second block boundary detection circuit 9, and the block boundary position and phase error value generated in the circuit (7 or 9) for which the larger value is obtained are taken as the final block boundary position (BL) and the final phase error value (P).

Thus, the difference between the block noise value ($SUME_{MAX}$, $SUM_{MAX}$) in the block boundary position and the block noise value in another pixel position is calculated as the boundary determination values (BD1, BD2) in each of the first and second block boundary detection circuits 7 and 9. When the BD1 is larger, it is determined that the input video signal has not been subjected to the resizing, and the block boundary position (BL1) and phase error value (P1) generated in the first block boundary detection circuit 7 are supplied to the removal unit 200. On the other hand, when the BD2 is larger, it is determined that the input video signal has been subjected to resizing, and the block boundary position (BL2) and phase error value (P2) generated in the second block boundary detection circuit 9 are supplied to the removal unit 200.

Therefore, with the detection unit 100, the detection of block noise is performed by the optimum processing method automatically corresponding to the mode (resized or non-resized) of the input video signal, even if no signal for identifying whether the input video signal has been resized or converted into an analog signal is supplied. When the input video signal has been resized or converted into an analog signal, and therefore a phase error has occurred in the input video signal, the detection unit 100 detects this error.

The removal unit 200 implements block noise removal processing with respect to the input video signal and generates the noise-removed video signal based on the block boundary position signal BL and phase error signal P supplied from the detection unit 100.

Figure 8:
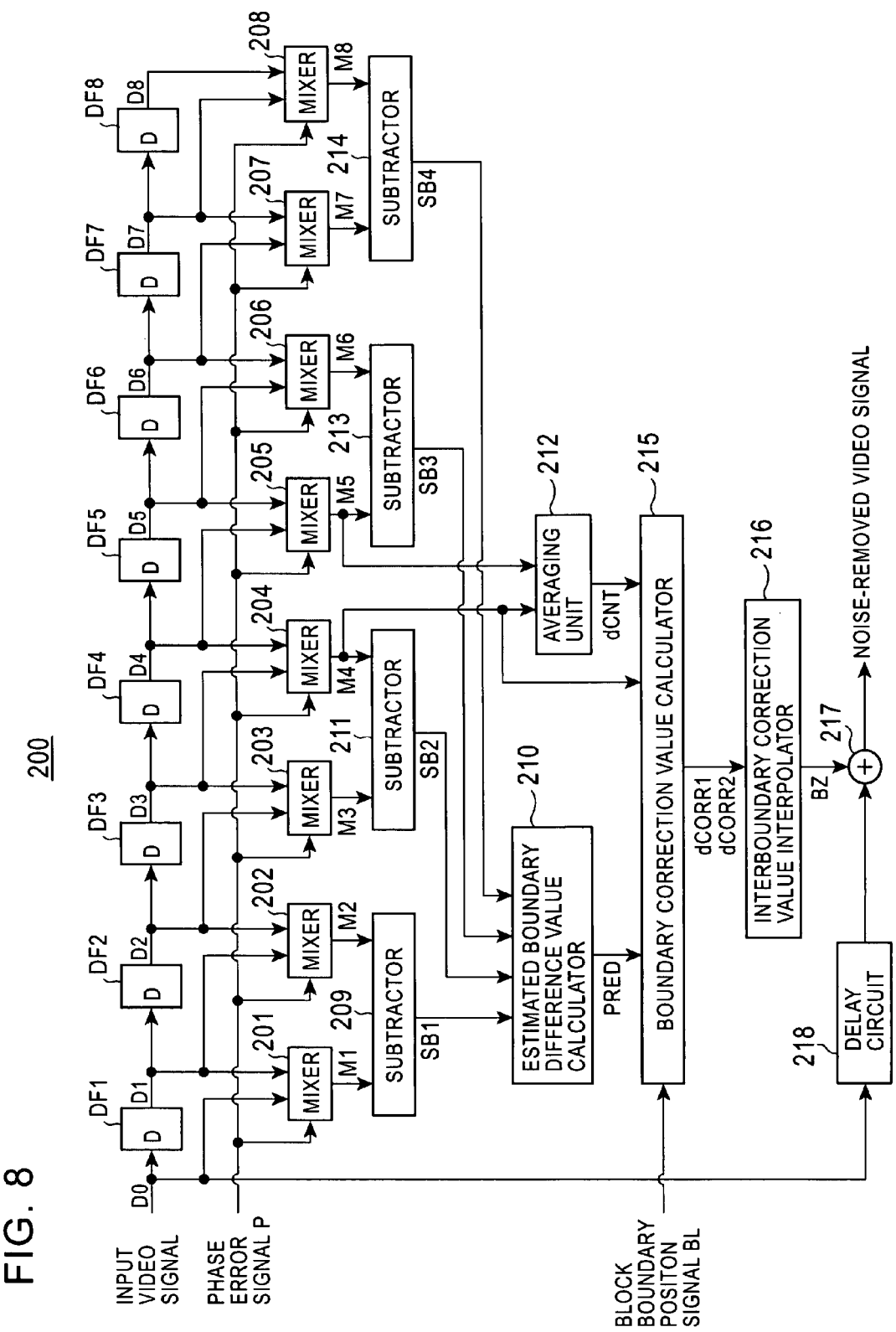
FIG. 8 illustrates the internal configuration of the removal unit of the block noise removal device shown in FIG. 2.

FIG. 8 illustrates the internal configuration of the removal unit 200.

Referring to FIG. 8, a flip-flop DF1 successively receives an input video signal for respective pixels, delays it by a period of one pixel, and supplies the resultant as a pixel sample value D1 to a flip-flop DF2 and mixers 201 and 202. The flip-flop DF2 delays the pixel sample value D1 by a period of one pixel and supplies it as a pixel sample value D2 to a flip-flop DF3 and mixers 202 and 203. The flip-flop DF3 delays the pixel sample value D2 by a period of one pixel and supplies it as a pixel sample value D3 to a flip-flop DF4 and mixers 203 and 204. The flip-flop DF4 delays the pixel sample value D3 by a period of one pixel and supplies it as a pixel sample value D4 to a flip-flop DF5 and mixers 204 and 205. The flip-flop DF5 delays the pixel sample value D4 by a period of one pixel and supplies it as a pixel sample value D5 to a flip-flop DF6 and mixers 205 and 206. The flip-flop DF6 delays the pixel sample value D5 by a period of one pixel and supplies it as a pixel sample value D6 to a flip-flop DF7 and mixers 206 and 207. The flip-flop DF7 delays the pixel sample value D6 by a period of one pixel and supplies it as a pixel sample value D7 to a flip-flop DF8 and mixers 207 and 208. The flip-flop DF8 delays the pixel sample value D7 by a period of one pixel and supplies it as a pixel sample value D8 to a mixer 208.

The configuration shown in FIG. 8 is built on the assumption that a block boundary position is present between the pixel corresponding to the flip-flop DF4 and the pixel corresponding to the flip-flop DF5, or in the position of the pixel corresponding to the flip-flop DF4. When a phase error of sampling is present, the phase error is found from the surrounding differential values. The method for finding the phase error is described below.

The mixer 201 mixes the pixel sample value D1 and a pixel sample value in the input video signal that precedes the pixel sample value D1 by one pixel period (referred to hereinbelow as "pixel sample value D0") at the below-shown mixing ratios, so as to obtain a phase-corrected pixel sample value M1. The mixing ratio is decided by the phase error signal P. The mixer 201 supplies the phase-corrected pixel sample value M1 to a subtraction unit 209.

(A) When the pixel position $TL_{MAX}$ is to the left of the pixel position $TL_{FE}$ ($0 \leq P < 0.5$):

$$M1 = D1 \cdot (P-1) + D0 \cdot P$$

(B) When the pixel position $TL_{MAX}$ is to the right of the pixel position $TL_{FE}$ ($0.5 < P < 1$):

$$M1 = D0$$

Figure 9A:
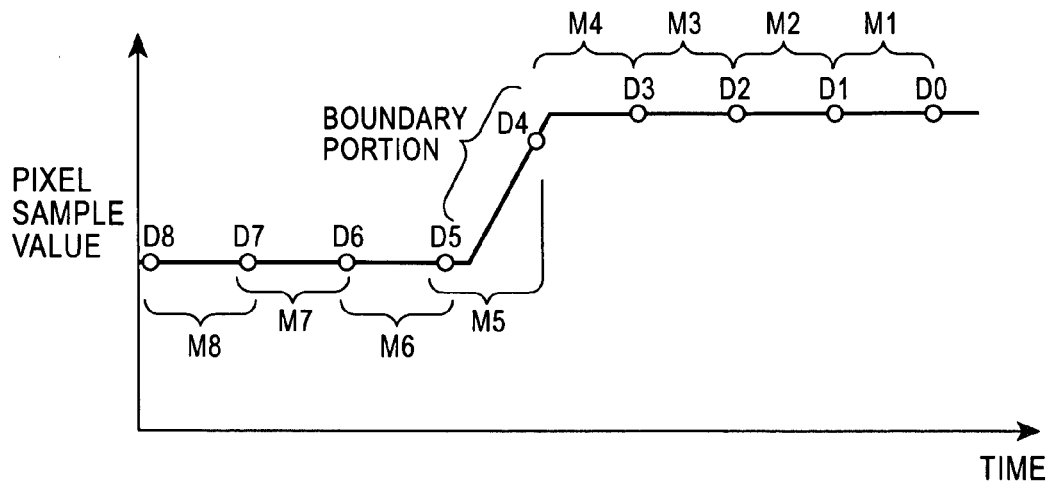
FIG. 9A to FIG. 9D illustrate the operation of mixers, subtraction units, estimation boundary differential value computation circuit, averaging circuit, and boundary correction value computation circuit shown in FIG. 8.
Figure 9B:
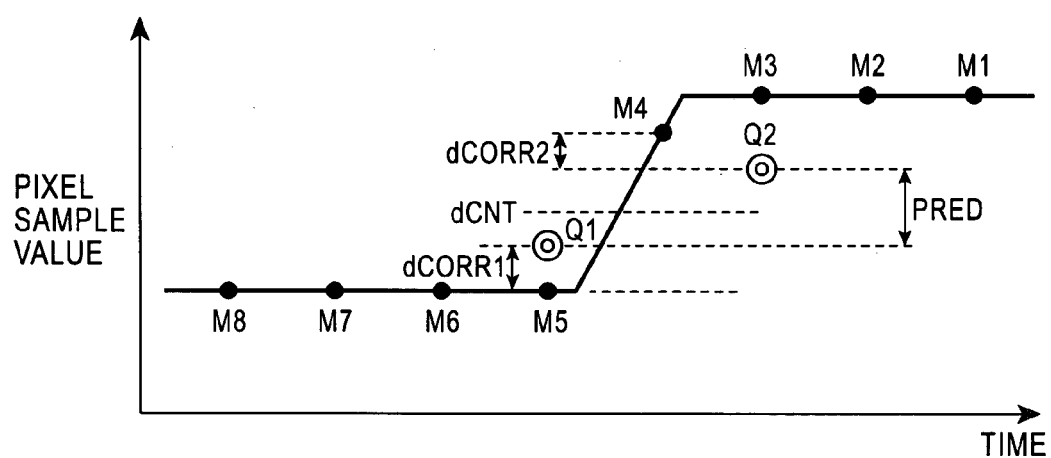
Figure 9C:
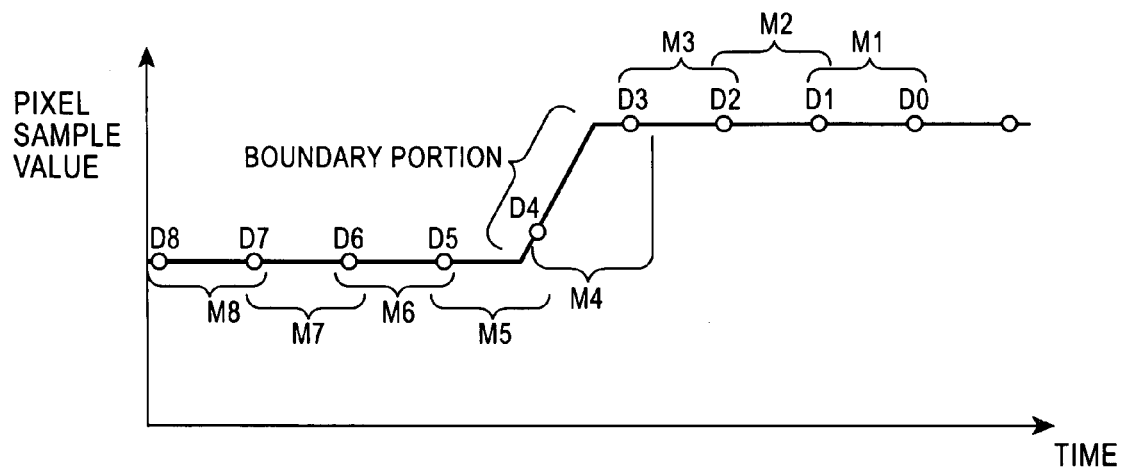

When M1 is found as shown in FIG. 9C, the position of M1 is to the right of the block boundary and has shifted in the direction (to the right) of withdrawing from the block boundary. Thus, no effect is produced by block distortions. Accordingly, M1=D0. The same is true hereinbelow.

The mixer 202 mixes the pixel sample values D1 and D2 at the below-indicated mixing ratios based on the phase error signal P, to obtain a phase-corrected pixel sample value M2. The mixer 202 then supplies the phase-corrected pixel sample value M2 to a subtraction unit 209.

(A) When the pixel position $TL_{MAX}$ is to the left of the pixel position $TL_{FE}$ ($0 \leq P < 0.5$):

$$M2 = D2 \cdot (P-1) + D1 \cdot P$$

(B) When the pixel position $TL_{MAX}$ is to the right of the pixel position $TL_{FE}$ ($0.5 < P < 1$):

$$M2 = D1$$

The subtraction unit 209 subtracts the phase-corrected pixel sample value M1 from the phase-corrected pixel sample value M2 and supplies the obtained subtraction result as a boundary peripheral differential value SB1 to an estimated boundary differential value computation circuit 210.

The mixer 203 mixes the pixel sample values D2 and D3 at the mixing ratios, which are decided by the phase error signal P, to obtain a phase-corrected pixel sample value M3, and supplies the phase-corrected pixel sample value M3 to a subtraction unit 211.

(A) When the pixel position $TL_{MAX}$ is to the left of the pixel position $TL_{FE}$ ($0 \leq P < 0.5$):

$$M3 = D3 \cdot (P-1) + D2 \cdot P$$

(B) When the pixel position $TL_{MAX}$ is to the right of the pixel position $TL_{FE}$ ($0.5 < P < 1$):

$$M3 = D2$$

The mixer 204 mixes the pixel sample values D3 and D4 at the mixing ratios based on the phase error signal P to obtain a phase-corrected pixel sample value M2, and supplies the phase-corrected pixel sample value M2 to the subtraction unit 211, an averaging circuit 212, and a boundary correction value computation circuit 215.

(A) When the pixel position $TL_{MAX}$ is to the left of the pixel position $TL_{FE}$ ($0 \leq P < 0.5$):

$$M4 = D4 \cdot (P-1) + D3 \cdot P$$

(B) When the pixel position $TL_{MAX}$ is to the right of the pixel position $TL_{FE}$ ($0.5 < P < 1$):

M4=D3

The subtraction unit 211 subtracts the phase-corrected pixel sample value M3 from the phase-corrected pixel sample value M4 and supplies the obtained subtraction result as a boundary peripheral differential value SB2 to the estimated boundary differential value computation circuit 210.

The mixer 205 mixes the pixel sample values D4 and D5 at the below-described mixing ratios based on the phase error signal P to obtain a phase-corrected pixel sample value M5, and supplies the phase-corrected pixel sample value M5 to the averaging circuit 212 and a subtraction unit 213.

(A) When the pixel position $TL_{MAX}$ is to the left of the pixel position $TL_{FE}$ ($0 \leq P < 0.5$):

M5=D5

When M5 is found as shown in FIG. 9A, the position of M5 is to the left of the block boundary and has shifted in the direction (to the left) of withdrawing from the block boundary. Thus, no effect is produced by block distortion. Accordingly, M5=D5. The same is true hereinbelow.

(B) When the pixel position $TL_{MAX}$ is to the right of the pixel position $TL_{FE}$ ($0.5 < P < 1$):

$M5 = D5 \cdot P + D4 \cdot (P-1)$

The mixer 206 mixes the pixel sample values D5 and D6 at the mixing ratios based on the phase error signal P to obtain a phase-corrected pixel sample value M6, and supplies the phase-corrected pixel sample value M6 to the subtraction unit 213.

(A) When the pixel position $TL_{MAX}$ is to the left of the pixel position $TL_{FE}$ ($0 \leq P < 0.5$):

M6=D6

(B) When the pixel position $TL_{MAX}$ is to the right of the pixel position $TL_{FE}$ ($0.5 < P < 1$):

$M6 = D6 \cdot P + D5 \cdot (P-1)$

The subtraction unit 213 subtracts the phase-corrected pixel sample value M5 from the phase-corrected pixel sample value M6 and supplies the obtained subtraction result as a boundary peripheral differential value SB3 to the estimated boundary differential value computation circuit 210.

The mixer 207 mixes the pixel sample values D6 and D7 at the below-described mixing ratios based on the phase error signal P to obtain a phase-corrected pixel sample value M7, and supplies the phase-corrected pixel sample value M7 to the subtraction unit 214.

(A) When the pixel position $TL_{MAX}$ is to the left of the pixel position $TL_{FE}$ ($0 \leq P < 0.5$):

M7=D7

(B) When the pixel position $TL_{MAX}$ is to the right of the pixel position $TL_{FE}$ ($0.5 < P < 1$):

$M7 = D7 \cdot P + D6 \cdot (P-1)$

The mixer 208 mixes the pixel sample values D7 and D8 at the below-described mixing ratios based on the phase error signal P to obtain a phase-corrected pixel sample value M8, and supplies the phase-corrected pixel sample value M8 to the subtraction unit 214.

(A) When the pixel position $TL_{MAX}$ is to the left of the pixel position $TL_{FE}$ ($0 \leq P < 0.5$):

M8=D8

(B) When the pixel position $TL_{MAX}$ is to the right of the pixel position $TL_{FE}$ ($0.5 < P < 1$):

$M8 = D8 \cdot P + D7 \cdot (P-1)$

The subtraction unit 214 subtracts the phase-corrected pixel sample value M7 from the phase-corrected pixel sample value M8 and supplies the obtained subtraction result as a boundary peripheral differential value SB4 to the estimation boundary differential value computation circuit 210.

The estimation boundary differential value computation circuit 210 finds an interpixel differential value at the block boundary section that can be taken as a differential value of adjacent pixels in the block boundary portion after the block noise removal processing. For this purpose, the estimation boundary differential value computation circuit 210 performs the below-described interpolation computations based on the boundary peripheral differential values SB1 to SB4. Then, the estimation boundary differential value computation circuit 210 supplies the interpixel differential value as a block boundary portion estimation differential value PRED to the boundary correction value computation circuit 215.

$PRED = \{3 \cdot (SB2 + SB3) - (SB1 + SB4)\}/4$

The averaging circuit 212 calculates an average value of the phase-corrected pixel sample value M4, which is obtained by mixing the pixel sample values D4 and D3 immediately after the block boundary position, and the phase-corrected pixel sample value M5, which is obtained by mixing the pixel sample values D5 and D6 immediately before the block boundary position. The averaging circuit 212 supplies this average value as a central value dCNT in the block boundary portion to the boundary correction value computation circuit 215.

The boundary correction value computation circuit 215 generates a block boundary correction value dCORR2 to the pixel sample value immediately after the block boundary position and another block boundary correction value dCORR1 to the pixel sample value immediately before the block boundary position. For this purpose, the boundary correction value computation circuit 215 performs the following computations based on the phase-corrected pixel sample value M4, block boundary portion estimation differential value PRED, and central value dCNT. Then, the boundary correction value computation circuit 215 supplies the block boundary correction values dCORR2 and dCORR1 to an interboundary correction value interpolation circuit 216.

$dCORR1 = \{dCNT - (PRED/2)\} - M5$ $dCORR2 = -\{dCNT + (PRED/2)\} + M4$

The computation of the block boundary correction values dCORR1 and dCORR2 is based on the assumption that a block boundary position is present between the pixel corresponding to the flip-flop circuit DF4 and the pixel corresponding to the flip-flop circuit DF5 in FIG. 8, or in the position of the pixel corresponding to the flip-flop circuit DF4. A block boundary position signal BL is introduced to the boundary correction value computation circuit 215. When the block boundary position arrives at a zone between the pixel corresponding to the flip-flop circuit DF4 and the pixel corresponding to the flip-flop circuit DF5 or in the position of the pixel corresponding to the flip-flop circuit DF4, the boundary correction value computation circuit 215 supplies the block boundary correction values dCORR1 and dCORR2 to the interboundary correction value interpolation circuit 216.

The interboundary correction value interpolation circuit 216 generates a block correction signal BZ indicating the level correction amount corresponding to each pixel position in the block, that is, between the block boundaries, by performing linear interpolation based on the block boundary correction values dCORR1 and dCORR2 generated in each of the block boundary portions of the consecutive blocks. Thus, the interboundary correction value interpolation circuit 216 generates a block correction signal BZ indicating the level correction amount corresponding to each pixel position in the block by performing for each block the linear interpolation based on the block boundary correction value dCORR2 (or dCORR1) generated in the left boundary portion of the block and the block boundary correction value dCORR1 (or dCORR2) generated in the right boundary portion of the block. The interboundary correction value interpolation circuit 216 supplies the block correction signal BZ to the addition unit 217. It should be noted that if a block boundary position signal BL with a constant 0 level representing a state in which no block boundary is present is supplied, the interboundary correction value interpolation circuit 216 supplies the block correction signal BZ representing a correction value 0 to the addition device 217.

A delay circuit 218 supplies the input video signal to the addition unit 217 with a delay corresponding to a total processing time of the flip-flops DF1 to DF8, mixers 201 to 208, subtraction units 209, 211, 213, 214, estimation boundary differential value computation circuit 210, averaging circuit 212, boundary correction value computation circuit 215, and interboundary correction value interpolation circuit 216.

The addition unit 217 adds the block correction signal BZ to the level of the input video signal that is delayed by the delay circuit 218, and generates a noise-removed video signal which has a moderated noise (abrupt level transition) in the block boundary portion.

The operation of the removal unit 200 will be explained when the input video signal shown in FIG. 9A and FIG. 9C is supplied. FIG. 9A and FIG. 9B show a case where the pixel position TL is on the left side of the pixel position $TL_{FE}$ ($0 \leq P < 0.5$) and FIG. 9C and FIG. 9D show a case where the pixel position $TL_{MAX}$ is on the right side of the pixel position $TL_{FE}$ ($0.5 \leq P < 1$).

FIG. 9A and FIG. 9C show a consecutive-9-pixel-worth of input video signal in the vicinity of the block boundary portion. The flip-flops DF1 to DF8 shown in FIG. 8 respectively generate pixel sample values D1 to D8 indicated by the white circles in FIG. 9A and FIG. 9C. The value of the input video signal supplied to the flip-flop DF1 at this point in time is the pixel sample value D0 in FIG. 9A and FIG. 9C.

Figure 9D:
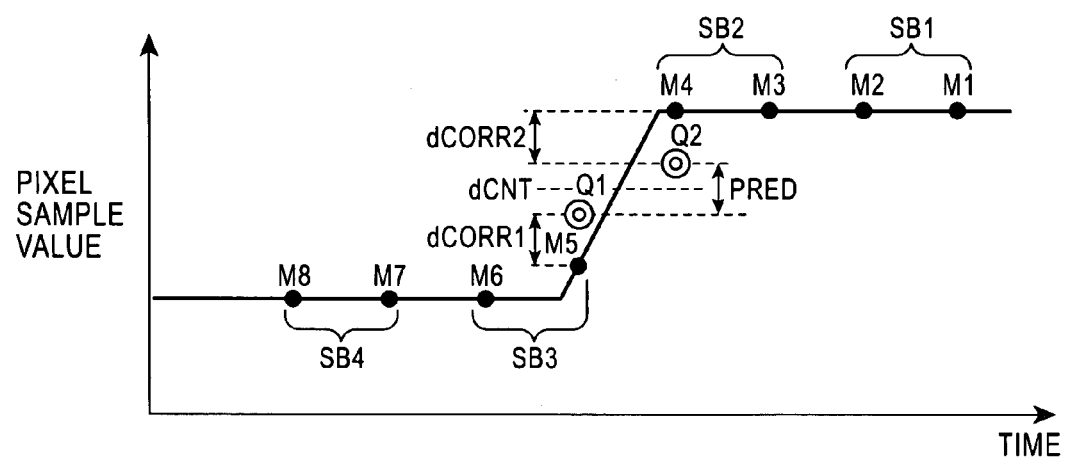

First, a sequence of phase-corrected pixel sample values M1 to M8 as shown in FIG. 9B and FIG. 9D is generated by mixing each two adjacent pixel sample values of the pixel sample values D0 to D8 at a mixing ratio decided by the phase error signal P supplied from the detection unit 100.

As shown in FIG. 9B and FIG. 9D, the difference between the phase-corrected pixel sample values M5 and M6 immediately before the block boundary position is taken as the boundary peripheral differential value SB3, and the difference between the phase-corrected pixel sample values M3 and M4 immediately after the block boundary position is taken as the boundary peripheral differential value SB2. Then, as shown in FIG. 9B and FIG. 9D, the difference between the phase-corrected pixel sample values M1 and M2 immediately after the phase-corrected pixel sample values M3 and M4 is taken as the boundary peripheral differential value SB1, and the difference between the phase-corrected pixel sample values M7 and M8 immediately before the phase-corrected pixel sample values M5 and M6 is taken as the boundary peripheral differential value SB4.

The estimation boundary differential value computation circuit 210 performs the above-described interpolation computation based on the boundary peripheral differential value SB1 to SB4 so as to calculate, as a block boundary portion estimation differential value PRED, the differential value between a pixel sample value Q1 after the block noise removal processing of the phase-corrected pixel sample value M4 in the block boundary portion (FIG. 9B and FIG. 9D) and a pixel sample value Q2 after the block noise removal processing of the phase-corrected pixel sample value M5 in the block boundary portion.

The boundary correction value computation circuit 215, first, calculates one of the pixel sample values Q1 and Q2 (FIG. 9B and FIG. 9D), for example Q1, in the below-described manner based on the central value dCNT in the phase-corrected pixel sample values M4 and M5 in the block boundary portion and the block boundary portion estimation differential value PRED.

$Q1=\{dCNT-(PRED/2)\}$

Then, the boundary correction value computation circuit 215 generates the block boundary correction value dCORR1 for the phase-corrected pixel sample values. M5 by subtracting the phase-corrected pixel sample value M5 from the pixel sample value Q1, as shown in FIG. 9B and FIG. 9D. The boundary correction value computation circuit 215 inverts the polarity of the block boundary correction value dCORR1 and issues the resultant value as the block boundary correction value dCORR2 for the phase-corrected pixel sample values M4 as shown in FIG. 9B and FIG. 9D.

The interboundary correction value interpolation circuit 216 generates for each block a block correction signal BZ indicating the level correction amount corresponding to each pixel position in the block by performing linear interpolation based on the block boundary correction value dCORR generated in the left boundary portion of the block and the block boundary correction value dCORR generated in the right boundary portion of the block. For example, when an input video signal is supplied that has a level transition indicated by the thick solid line in FIG. 10A, the interboundary correction value interpolation circuit 216 generates a block correction signal BZ indicating the level correction amount corresponding to each pixel position in the block II, as shown by the thick solid line in FIG. 10B, by performing linear interpolation based on the block boundary correction value dCORR2 generated in the boundary portion of the blocks I and II and the block boundary correction value dCORR1 generated in the boundary portion of the blocks II and III.

Therefore, by subjecting an input video signal to the level correction based on the block correction signal BZ, a noise-removed video signal, as indicated by the thick broken line in FIG. 10A, from which block noise has been removed without degrading the image quality, can be obtained, even if the video signal as indicated by the thick solid line in FIG. 10A in which the difference in level between the adjacent blocks is large is entered.

This application is based on Japanese Patent Application No. 2006-114834 filed on Apr. 18, 2006 and the entire disclosure thereof is incorporated herein by reference.

What is claimed is:

1. A block noise removal device for removing block noise from a decoded video signal obtained by coding and decoding an input video signal for each pixel block composed of a plurality of pixels, the block noise removal device comprising:
   a boundary position detector for detecting a first block boundary position of a first boundary portion between a first said pixel block and a second said pixel block and a second block boundary position of a second boundary portion between said second pixel block and a third said pixel block from said video signal, wherein said first, second and third pixel blocks are three continuous pixel blocks;

wherein the first and second pixel blocks are consecutively adjacent to each other in a first direction and wherein the second and third pixel blocks are consecutively adjacent to each other in the first direction, a first boundary correction amount calculator for calculating a first block boundary correction value that indicates a first correction amount for a first pixel sample value immediately before said first block boundary position and a second correction amount for a second pixel sample value immediately after said first block boundary position based on at least two consecutive said pixel sample values immediately before said first block boundary position and at least two consecutive said pixel sample values immediately after said first block boundary position, each said pixel sample value representing a level of each pixel in said video signal;

a second boundary correction amount calculator for calculating a second block boundary correction value that indicates a third correction amount for a third pixel sample value immediately before said second block boundary position and a fourth correction amount for a fourth pixel sample value immediately after said second block boundary position based on at least two consecutive said pixel sample values immediately before said second block boundary position and at least two consecutive said pixel sample values immediately after said second block boundary position;

a correction value interpolation unit for generating a block noise correction signal representing a correction amount for said pixel sample values of all pixels in said second pixel block by interpolation computations based on said first block boundary correction value for the first block boundary position and said second block boundary correction value for the second block boundary position; and a signal generator for adding said block noise correction signal to said video signal to generate a noise-removed video signal.

2. The block noise removal device according to claim 1, wherein said first boundary correction amount calculator calculates the first block boundary correction value based on a first differential value between said at least two consecutive pixel sample values immediately before said first block boundary position and a second differential value between said at least two said consecutive pixel sample values immediately after said first block boundary position, and said second boundary correction amount calculator calculates the second block boundary correction value based on a third differential value between said at least two consecutive pixel sample values immediately before said second block boundary position and a fourth differential value between said at least two said consecutive pixel sample values immediately after said second block boundary position.

3. The block noise removal device according to claim 2, wherein when a sample timing shifts in a direction of hastening the sample timing, each of said first and third differential values is processed as a value that is not affected by block distortion.

4. The block noise removal device according to claim 2, wherein when a sample timing shifts in a direction of delaying the sample timing, each of said second and fourth differential values is processed as a value that is not affected by block distortion.

5. The block noise removal device according to claim 1, wherein said first boundary correction amount calculator includes:

a first median value unit for calculating an average value of said pixel sample value immediately before said first block boundary position and said pixel sample value immediately after said first block boundary position as a first central value;

a first estimated difference value unit for calculating a differential value of said pixel sample value immediately before said first block boundary position and said pixel sample value immediately after said first block boundary position as a first block boundary portion estimated differential value by interpolation computations based on said first and second differential values; and a first correction value unit for obtaining said first block boundary correction value by subtracting half said first block boundary portion estimated differential value and said pixel sample value immediately after said first block boundary position from said first central value, and said second boundary correction amount calculator includes:

a second median value unit for calculating an average value of said pixel sample value immediately before said second block boundary position and said pixel sample value immediately after said second block boundary position as a second central value;

a second estimated difference value unit for calculating a differential value of said pixel sample value immediately before said second block boundary position and said pixel sample value immediately after said second block boundary position as a second block boundary portion estimated differential value by interpolation computations based on said third and fourth differential values; and a second correction value unit for obtaining said second block boundary correction value by subtracting half said second block boundary portion estimated differential value and said pixel sample value immediately after said second block boundary position from said second central value.

* * * * *